(12) United States Patent
Kim et al.

(10) Patent No.: US 12,361,639 B2
(45) Date of Patent: Jul. 15, 2025

(54) ELECTRONIC DEVICE AND CONTROL METHOD THEREOF

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Min Hyuk Kim, Daejeon (KR); Joo Ho Lee, Daejeon (KR); Hyun Jin Ku, Daejeon (KR); Dahyun Kang, Daejeon (KR); Hyunho Ha, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 338 days.

(21) Appl. No.: 18/172,716

(22) Filed: Feb. 22, 2023

(65) Prior Publication Data

US 2023/0206551 A1  Jun. 29, 2023

Related U.S. Application Data

(63) Continuation of application No. PCT/KR2021/012283, filed on Sep. 9, 2021.

(30) Foreign Application Priority Data

Oct. 12, 2020  (KR) .................. 10-2020-0130867

(51) Int. Cl.
*G06T 17/00* (2006.01)
*G06T 3/40* (2024.01)
(Continued)

(52) U.S. Cl.
CPC ............... *G06T 17/00* (2013.01); *G06T 3/40* (2013.01); *G06T 7/586* (2017.01); *G06T 7/97* (2017.01);
(Continued)

(58) Field of Classification Search
CPC ........ H04N 23/74; H04N 23/56; H04N 23/71; H04N 23/45; H04N 13/271; H04N 13/254;
(Continued)

(56) References Cited

U.S. PATENT DOCUMENTS 7,583,297 B2  9/2009  Yamada
8,482,722 B2  7/2013  Min et al.
(Continued)

FOREIGN PATENT DOCUMENTS

EP  3 664 039 A1  6/2020
JP  2020/112981 A  7/2020
(Continued)

OTHER PUBLICATIONS

Nam et al., "Practical SVBRDF Acquisition of 3D Objects with Unstructured Flash Photography," (Published:Dec. 4, 2018).
(Continued)

*Primary Examiner* — Xiao M Wu
*Assistant Examiner* — Scott E Sonners
(74) *Attorney, Agent, or Firm* — Jefferson IP Law, LLP

(57) ABSTRACT

An electronic device and a control method thereof are provided. The electronic device includes a camera, a camera flash, and at least one processor configured to control the camera to capture a natural light image and a depth image of an object, control the camera and the camera flash to capture an artificial light image of the object, obtain distance information from the depth image to generate a depth mask image, create a cluster mask image from the natural light image, obtain a flash image in which the illuminance of the natural light image has been removed from the illuminance of the artificial light image, obtain an optimization parameter based on the distance information, the depth mask image, the cluster mask image, and the flash image, and
(Continued)

obtain three-dimensional topographic information and surface reflection information about the object based on the obtained optimization parameter.

15 Claims, 13 Drawing Sheets

(51) Int. Cl.
| | |
|---|---|
| G06T 7/00 | (2017.01) |
| G06T 7/586 | (2017.01) |
| G06T 15/50 | (2011.01) |
| G06V 10/141 | (2022.01) |
| G06V 10/60 | (2022.01) |
| G06V 10/74 | (2022.01) |
| G06V 10/762 | (2022.01) |
| H04N 13/271 | (2018.01) |
| H04N 23/56 | (2023.01) |

(52) U.S. Cl.
CPC ............ *G06T 15/50* (2013.01); *G06V 10/141* (2022.01); *G06V 10/60* (2022.01); *G06V 10/761* (2022.01); *G06V 10/762* (2022.01); *H04N 13/271* (2018.05); *H04N 23/56* (2023.01); *G06T 2207/10024* (2013.01); *G06T 2207/10028* (2013.01); *G06T 2207/10152* (2013.01); *G06T 2207/20016* (2013.01)

(58) Field of Classification Search
CPC .... G06F 18/22; G06F 3/0304; G06F 3/04842; G06F 3/04845; G06F 16/7837; G06T 19/006; G06T 2207/10028; G06T 15/08; G06T 2207/10024; G06T 7/521; G06T 2207/10152; G06T 7/97; G06T 7/50; G06T 7/90; G06T 7/73; G06T 2200/04; G06T 2207/30196; G06T 5/50; G06T 2207/10004; G06T 15/506; G06T 7/60; G06T 2207/20081; G06T 15/50; G06T 15/10; G06T 2215/16; G06T 7/80; G06T 7/586; G06T 2207/20221; G06T 2207/30201; G06T 7/70; G06T 7/194; G06T 2200/08; G06T 5/00; G06T 2207/20016; G06T 2207/20224; G06T 11/00; G06T 17/00; G06T 7/174; G06T 1/0007; G06T 1/00; G06T 15/205; G06T 7/254; G06T 7/00; G06V 10/141; G06V 20/20; G03B 15/05; G03B 7/16; G03B 15/03

See application file for complete search history.

(56) References Cited

U.S. PATENT DOCUMENTS

| | | | |
|---|---|---|---|
| 9,443,345 | B2 | 9/2016 | Shim |
| 10,281,396 | B2 | 8/2019 | Kim et al. |
| 10,554,890 | B1* | 2/2020 | Le .............................. G06T 5/73 |
| 11,380,056 | B2 | 7/2022 | Kim et al. |
| 11,394,945 | B2 | 7/2022 | Mecca et al. |
| 2005/0190288 | A1 | 9/2005 | Yamada |
| 2006/0171566 | A1* | 8/2006 | Gindele .................. G06T 7/586 356/3 |
| 2007/0025720 | A1* | 2/2007 | Raskar ...................... G06T 5/50 396/213 |
| 2016/0227182 | A1* | 8/2016 | Uekusa .................. H04N 23/74 |
| 2018/0087894 | A1 | 3/2018 | Kim et al. |
| 2018/0160102 | A1 | 6/2018 | Luo et al. |
| 2019/0017812 | A1 | 1/2019 | Nakagawa et al. |
| 2020/0160593 | A1 | 5/2020 | Gu et al. |
| 2021/0358211 | A1 | 11/2021 | Kim et al. |

FOREIGN PATENT DOCUMENTS

| | | | |
|---|---|---|---|
| KR | 10-2005-0066501 | A | 6/2005 |
| KR | 10-1102150 | B1 | 1/2012 |
| KR | 10-1495299 | B1 | 2/2015 |
| KR | 10-1601564 | B1 | 3/2016 |
| KR | 10-1865886 | B1 | 6/2018 |
| KR | 10-1873648 | B1 | 7/2018 |
| KR | 10-2020-0040194 | A | 4/2020 |
| KR | 10-2108480 | B1 | 5/2020 |
| KR | 10-2287472 | B1 | 8/2021 |
| WO | 2017/154707 | A1 | 9/2017 |
| WO | 2020/076026 | A1 | 4/2020 |

OTHER PUBLICATIONS

Nam et al, "Simultaneous Acquisition of Microscale Reflectance and Normals," ACM Transactions on Graphics, vol. 35, Issue 6, Article No. 185, pp. 1-11, https:/doi.org/10.1145/2980179.2980220, (Published:Dec. 5, 2016).

Aittala et al., 'Two-Shot SVBRDF Capture for Stationary Materials,' ACM Trans. Graph. 34, 4, Article 110 (Aug. 2015), 13 pages. DOI = 10.1145/2766967 http:/doi.acm.org/10.1145/2766967 (Published:Jul. 27, 2015).

Cao et al., "Stereoscopic Flash and No-Flash Photography for Shape and Albedo Recovery," (Published:Jun. 2020).

Li et al., "Learning to Reconstruct Shape and Spatially-Varying Reflectance from a Single Image," ACM Trans. Graph., vol. 37, No. 6, Article 269. Publication date: Nov. 2018.

Boss et al., 'Two-shot Spatially-varying BRDF and Shape Estimation,' (Published:Jun. 2020).

Cook et al., "A Reflectance Model for Computer Graphics," ACM Transactions on Graphics, vol. 1, No. 1, Jan. 1982, pp. 7-24.

Walter et al., "Microfacet Models for Refraction through Rough Surfaces," Eurographics Symposium on Rendering (2007), Published:Jun. 25, 2007.

Korean Office Action with English translation dated Oct. 16, 2024; Korean Appln. No. 10-2020-0130867.

* cited by examiner

ELECTRONIC DEVICE AND CONTROL METHOD THEREOF

CROSS-REFERENCE TO RELATED APPLICATION(S)

This application is a continuation application, claiming priority under § 365(c), of an International application No. PCT/KR2021/012283, filed on Sep. 9, 2021, which is based on and claims the benefit of a Korean patent application number 10-2020-0130867, filed on Oct. 12, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) KOREA ADVANCED INSTITUTE OF SCIENCE AND TECHNOLOGY.

BACKGROUND

1. Field

The disclosure relates to an electronic device and a control method thereof. More particularly, the disclosure relates to an electronic device and a control method for processing an image captured for a three-dimensional (3D) effect.

2. Description of Related Art

Various devices and applications for reproducing a virtual environment have been developed along with the development of augmented reality (AR) and virtual reality (VR) technology. There is an increasing demand for three-dimensional content according to the development of a technology for reproducing a virtual environment. In order to allow a user to feel an attentional engagement like reality in a virtual environment, it is important to reproduce geometry and spatially varying bidirectional reflectance distribution function (SVBRDF) as it is.

Image-based inverse rendering technologies have been developed for the reproduction of information related to three dimensions. The related-art image-based inverse rendering technology may predict geometry and surface reflection properties by using an image obtained by capturing an object at various angles. However, the existing image-based inverse rendering technique requires a special light dome for capturing or several hundreds of fields or more of data.

There is necessity of technology to obtain accurate geometry and SVBRDF with only small amount of data and provide a three-dimensional (3D) content.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a control method for obtaining information capable of generating 3D content based on small data.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a camera flash, and at least one processor configured to control the camera to capture a natural light image and a depth image of an object, control the camera and the camera flash to capture an artificial light image of the object comprising an artificial lighting, obtain distance information from the depth image and generate a depth mask image, generate a cluster mask image from the natural light image, obtain a flash image in which illuminance of the natural light image has been removed from the illuminance of the artificial light image, obtain an optimization parameter based on the distance information, the depth mask image, the cluster mask image, and the flash image, and obtain three-dimensional (3D) geometry and surface reflection information about the object based on the obtained optimization parameter.

The electronic device further includes a display to display an image comprising a 3D object based on the obtained 3D geometry and surface reflection information of the object.

The at least one processor may generate an image pyramid comprising a plurality of images by downsampling the depth mask image, cluster mask image, and flash image to a preset size.

The at least one processor may obtain a first optimization parameter from the smallest image among the generated image pyramid, obtain a second optimization parameter from the image of the next size based on the obtained first optimization parameter, and obtain the optimization parameter from the largest image based on obtained n−1 optimization parameter.

The at least one processor may set a pixel comprising distance information from among the depth images to 1, and set a pixel having no distance information to 0 based on the distance information so as to generate the depth mask image.

The at least one processor may identify a super-pixel by filtering the natural light image and generate the cluster mask image based on the identified super-pixel.

The at least one processor may set the super-pixel to an independent cluster, generate a weight graph between clusters including a node representing each cluster and an edge representing an average color distance of an area in which a plurality of clusters are adjacent, obtain an edge weight by applying a weight to a difference in average color values between super-pixels included in and each adjacent cluster based on adjacent length between the clusters, obtain an average color value of the cluster, and based on the obtained average color value being less than or equal to a preset color threshold and the edge weight being less than or equal to the preset weight threshold value, generate the cluster mask image by merging clusters.

The optimization parameter includes depth change, change angle of a normal vector, diffuse albedo, specular albedo and roughness information per cluster.

The at least one processor may obtain the 3D geometry based on the depth change and the change angle of the normal vector.

The at least one processor may obtain the surface reflection information based on the diffuse albedo, specular albedo and roughness information per cluster.

In accordance with another aspect of the disclosure, a method of controlling an electronic device is provided. The method includes capturing a natural light image and a depth image of an object, capturing an artificial light image of the object comprising an artificial lighting, obtaining distance information from the depth image and generating a depth mask image, generating a cluster mask image from the natural light image, obtaining a flash image in which illuminance of the natural light image has been removed from the illuminance of the artificial light image, obtaining an optimization parameter based on the distance information, the depth mask image, the cluster mask image, and the flash image, and obtaining three-dimensional (3D) geometry and surface reflection information about the object based on the obtained optimization parameter.

The method further includes displaying an image comprising a 3D object based on the obtained 3D geometry and surface reflection information of the object.

The obtaining the optimization parameter includes generating an image pyramid comprising a plurality of images by downsampling the depth mask image, cluster mask image, and flash image to a preset size.

The obtaining the optimization parameter includes obtaining a first optimization parameter from the smallest image among the generated image pyramid, obtaining a second optimization parameter from the image of the next size based on the obtained first optimization parameter, and obtaining the optimization parameter from the largest image based on obtained n−1 optimization parameter.

The generating the depth mask image includes setting a pixel comprising distance information from among the depth images to 1, and setting a pixel having no distance information to 0 based on the distance information so as to generate the depth mask image.

According to various embodiments of the disclosure, the electronic device and a control method thereof may obtain geometry and SVBRDF information of an object by using small amount of data.

The electronic device and the control method may generate 3D content by using the obtained geometry and SVBRDF information of the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
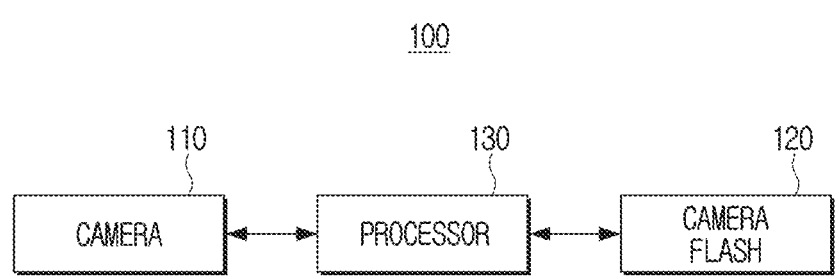
FIG. 1 is a block diagram illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms, such as "first," "second," and the like may be used to describe various components, but the components should not be limited by the terms. The terms are used to distinguish a component from another.

It is to be understood that the terms, such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof. It will be understood that when an element is referred to as being "coupled" or "connected" to another element, there may be other elements in the middle, although it may be directly coupled or connected to the other element. In contrast, when an element is referred to as being "directly coupled to" or "directly connected to" another element, there are no elements present therebetween.

The term, such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module.

In the description of the disclosure, the order of each step should be understood non-restrictively unless a preceding step must be performed before a subsequent step logically and temporally. For example, except for the exceptional case above, although a process described as a subsequent step is performed before a process described as a preceding step, it does not affect the essence of the disclosure and the scope of the disclosure should be defined regardless of order of steps. In addition, description of "A or B" is defined to mean that both A and B are included, as well as selectively indicating any one of A and B. In addition, the term "including" in this specification has a comprehensive meaning to further include another component in addition to elements enumerated to be included.

In this specification, only essential components necessary for the description of the disclosure are described and components not related to the essence of the disclosure are not mentioned. In addition, only the mentioned components should not be construed to be included in an exclusive sense but should be construed in a non-exclusive sense to include any other component.

When it is decided that a detailed description for the known art related to the disclosure may unnecessarily obscure the gist of the disclosure, the detailed description may be shortened or omitted. While each embodiment may be implemented or operated independently, each embodiment may be implemented or operated in combination.

FIG. 1 is a block diagram illustrating a configuration of an electronic device according to an embodiment of the disclosure.

Referring to FIG. 1, an electronic device 100 includes a camera 110, a camera flash 120, and a processor 130.

For example, an electronic device 100a may include a smartphone, a tablet personal computer (PC), a laptop computer, a navigation system, a slate PC, a wearable device, a digital television (TV), a desktop computer, a laptop computer, a kiosk, and the like.

The camera 110 captures an object, and the camera flash 120 provides lighting when capturing the object. For example, the camera flash 120 may irradiate artificial light when capturing an image with reference to the sensed ambient illuminance. Alternatively, the camera flash 120 may irradiate or may not irradiate the artificial light regardless of the ambient illuminance. In the disclosure, when the camera 110 captures an object, the camera flash 120 does not emit artificial light once regardless of the ambient illuminance, and irradiates the artificial light once.

The camera 110 may capture an object without receiving artificial lighting from the camera flash 120. The disclosure is referred to as a natural light image without receiving artificial lighting. The camera 110 may capture an object by receiving the artificial lighting from the camera flash 120. In the disclosure, an image captured by receiving artificial light is called an artificial light image. The artificial light image includes a natural light component. For example, the artificial light image includes both a natural light component and an artificial light component.

The camera 110 captures a depth image including depth information of an object. For example, the camera 110 may include a red green blue (RGB) camera and a depth camera. The RGB camera may capture a general image including RGB information, and the depth camera may capture a depth image including depth information. The camera 110 may capture three images of a natural light image, an artificial light image, and a depth image at one place by using one camera or a plurality of cameras.

The processor 130 may control each configuration of the electronic device 100. For example, the processor 130 may control the camera 110 to capture an image and control the camera flash 120 to provide lighting during capturing. For example, when the camera 110 includes an RGB camera and a depth camera, the processor 130 may control the RGB camera to capture a natural light image and control the depth camera to capture the depth image. The processor 130 may control the RGB camera and the depth camera to simultaneously perform a capturing operation, and may control the RGB camera and the depth camera to sequentially perform a capturing operation. The processor 130 may simultaneously control the RGB camera and the camera flash 120 such that the natural light image and the artificial light image are sequentially captured after the RGB camera captures the natural light image.

The processor 130 obtains distance information from a captured depth image and generates a depth mask image. For example, the processor 130 may set a pixel including distance information to 1 based on the depth image and the obtained distance information, and generate a depth mask image by setting the pixel having no distance information to 0.

The processor 130 generates a cluster mask image from a natural light image. The processor 130 may filter the natural light image to identify a super pixel. A super pixel refers to a pixel in which similar pixels among adjacent pixels are grouped. For example, a super pixel may refer to a group in which pixels having similar characteristics (e.g., color, brightness, or the like) among adjacent pixels of a natural light image are collected. The processor 130 may generate a cluster mask image based on the identified super pixels. According to an embodiment of the disclosure, the processor 130 may first set a super pixel as an independent cluster and generate a weight graph. For example, the weight graph may include node indicating each cluster and an edge indicating an average color distance of areas in which a plurality of clusters are adjacent. The processor 130 may obtain the trunk weight based on the weight graph. For example, the trunk weight may be obtained by applying a weight to a difference between average color values between super pixels included in each adjacent cluster based on adjacent lengths between the clusters The processor 130 may combine the cluster when the obtained distance of the average color value is less than or equal to a preset color threshold value and the trunk weight is less than or equal to a preset weight threshold value. The processor 130 may generate a cluster mask image including a cluster combined by repeating the above-described process.

The processor 130 generates a flash image by removing the natural light image from the artificial light image. The processor 130 may remove the illuminance of the natural light image in the illuminance of the artificial light image. As described above, the artificial light image may include both a natural light component and an artificial light component. The natural light image may include a natural light component. Therefore, when the natural light image is removed from the artificial light image, a flash image including only the artificial lighting component provided by the camera flash 120 may be obtained.

The processor 130 obtains an optimization parameter based on distance information, a depth mask image, a cluster mask image, and a flash image. The processor 130 may generate an image pyramid including a depth mask image, a cluster mask image, and a plurality of images obtained by down-sampling the flash image to a predetermined size. In addition, the processor 130 may perform an optimization parameter calculation process. For example, the processor 130 may set a preset initial parameter and obtain a first optimization parameter from the smallest image among the generated image pyramids. The obtained first optimization parameter may be an input value of an optimization parameter calculation process performed in an image of the next size. The processor 130 may obtain the second optimization parameter from the image of the next size by inputting the first optimization parameter. The processor 130 repeats the above-described optimization parameter calculation process and may obtain a final optimization parameter from the largest image among the generated image pyramid. For example, the optimization parameter may include a depth change, a change angle of the normal vector, a diffuse albedo, specular albedo per cluster, roughness information, and the like.

The processor 130 obtains 3D geometry and surface reflection information of the object based on the obtained optimization parameter. For example, the processor 130 may obtain 3D geometry based on a depth change, a change angle of a normal vector, and obtain surface reflection information based on the diffuse albedo and the specular albedo and roughness information per each cluster.

The electronic device 100 may further include configurations other than the above configuration.

Figure 2:
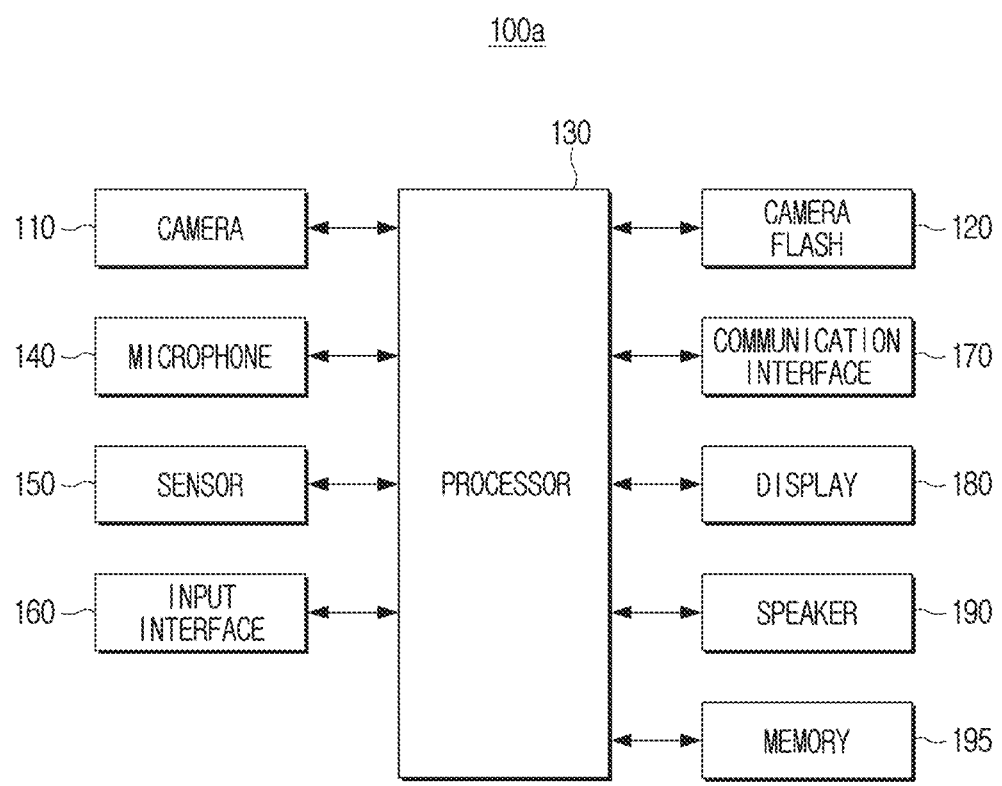
FIG. 2 is a block diagram illustrating a specific configuration of an electronic device according to an embodiment of the disclosure.

FIG. 2 is a block diagram illustrating a specific configuration of an electronic device according to an embodiment of the disclosure.

Referring to FIG. 2, an electronic device 100*a* may include the camera 110, the camera flash 120, the processor 130, a microphone 140, a sensor 150, an input interface 160, a communication interface 170, a display 180, a speaker 190, and a memory 195. Since the camera 110 and the camera flash 120 are the same as those described in FIG. 2, a description thereof will be omitted.

The microphone 140 may receive an audio signal. According to an embodiment of the disclosure, the electronic device 100*a* may include a plurality of microphones. The plurality of microphones may be arranged in an upper region, a lower region, a front region, a rear region, and a camera arrangement region of the electronic device 100*a*. At least one microphone among the plurality of microphones may be a directional microphone. The microphone 140 may obtain an audio signal from a subject located within a preset distance under the control of the processor 130.

The sensor 150 may sense a direction in which the electronic device 100*a* or the camera 110 faces. Alternatively, the sensor 150 may detect environment information around the electronic device 100*a*. For example, the camera 110 may be fixed to the electronic device 100*a*. Therefore, the direction in which the camera 110 faces may coincide with the direction in which the electronic device 100*a* faces. In addition, the direction in which the camera 110 faces may be a capturing direction. Accordingly, the processor 130 may obtain capturing direction information or direction information of the electronic device 100*a* according to direction information sensed by the sensor 150. Alternatively, the sensor 150 may sense environmental information, such as temperature, humidity, illuminance, or the like, around the electronic device 100*a*. For example, the sensor 150 may include an acceleration sensor, a gravity sensor, a gyro sensor, a geomagnetic sensor, a direction sensor, a motion recognition sensor, a proximity sensor, a voltmeter, a current meter, a barometer, a hygrometer, a thermometer, an illuminance sensor, a thermal sensor, a touch sensor, an infrared sensor, an ultrasonic sensor, and the like.

The input interface 160 may input a control command from a user. For example, the input interface 160 may be implemented as a key pad, a touch pad, or the like. The input interface 160 may perform a function to receive a command from a user and may be called an inputter, an input module, or the like.

The input interface 160 may be implemented as the camera 110, the microphone 140, the sensor 150, or the display 180 in addition to the key pad and the touch pad described above. For example, when the input interface 160 is implemented with the camera 110, the electronic device 100*a* may capture the facial expression or motion of the user. The processor 130 may recognize a control command based on a captured expression or operation. When the input interface 160 is implemented as the microphone 140, the electronic device 100*a* may receive a user's voice. The processor 130 may recognize a control command based on the input voice. When the input interface 160 is implemented with the sensor 150, the sensor 150 may receive an operation of a user or the like. The processor 130 may recognize a control command based on the input signal. When the display 180 is implemented with a touch screen, the electronic device 100*a* may receive a control command through a touch screen.

The communication interface 170 communicates with an external device. The communication interface 170 may transmit a depth image, a natural light image, and an artificial light image to an external device and receive the same from an external device. Alternatively, the communication interface 170 may transmit an image including an optimization parameter, three-dimensional geometry or surface reflection information, and a three-dimensional object to an external device or receive the image from an external device.

For example, the communication interface 170 may include a module capable of performing communication in a manner, such as long-term evolution (LTE), fifth generation (5G), wireless fidelity (Wi-Fi), Bluetooth, and the like. The communication interface 170 may also include a global positioning system (GPS) module. The communication interface 170 communicating with an external device may be referred to as a communicator, a communication module, a transceiver, or the like.

The display 180 may display a captured image. Alternatively, the processor 130 may generate an image including a three-dimensional object based on the obtained three-dimensional (3D) geometry and surface reflection information, and the display 180 may display an image including the generated 3D object. For example, the display 180 may be implemented as a liquid crystal display (LCD) display, an organic light emitting diode (OLED) display, a flexible display, a touch screen, or the like.

The speaker 190 may output the obtained audio signal. The speaker 190 may output an input command of the user, state-related information of the electronic device 100*a*, or motion-related information as a voice or a notification sound.

The memory 195 may store data for performing a function of the electronic device 100*a*, and may store programs, commands, and the like, which are driven in the electronic device 100*a*. In addition, the memory 195 may store an algorithm (or program) for generating a depth mask image, an algorithm for generating a cluster mask image, an algorithm for obtaining an optimization parameter, three-dimensional geometry, and an algorithm for obtaining surface reflection information. The algorithm stored in the memory 195 is loaded to the processor 130 under the control of the processor 130 to perform an image processing or information obtaining process. For example, the memory 195 may be implemented as a read-only memory (ROM), a random-access memory (RAM), a hard disk drive (HDD), a solid state drive (SSD), a memory card, or the like.

The electronic device 100a may include all of the above-described elements, and may include some elements. In addition, the electronic device 100a may further include other configurations for performing various functions in addition to the above-described configuration.

The disclosure may generate 3D content by reconstructing an object into a 3D format in the same manner as an actual object based on the obtained geometry and surface reflection information. The disclosure may obtain geometry and surface reflection information with low data by obtaining 3D geometry and surface reflection information by using three images.

A process of obtaining 3D geometry and surface reflection information will be described below.

Figure 3A:
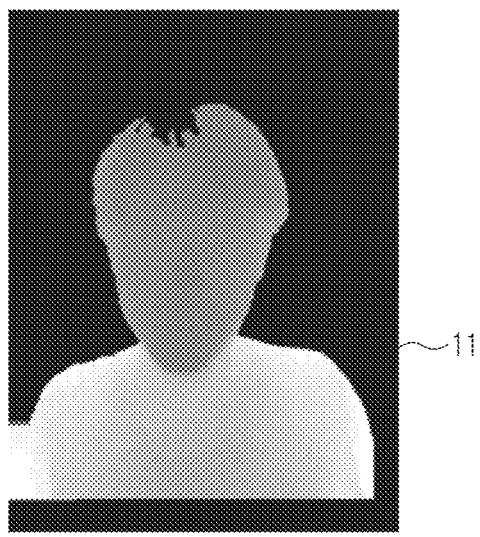
FIG. 3A is a diagram illustrating a depth image according to an embodiment of the disclosure.
Figure 3B:
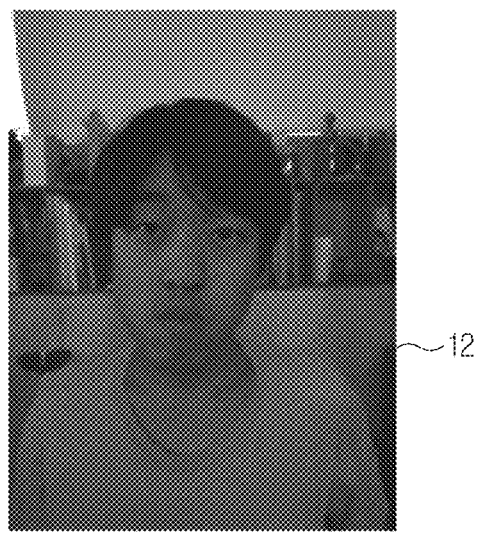
FIG. 3B is a diagram illustrating a natural light image according to an embodiment of the disclosure.
Figure 3C:
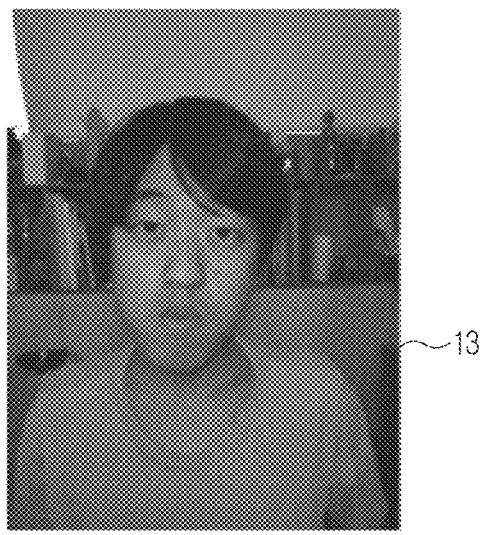
FIG. 3C is a diagram illustrating an artificial light image according to an embodiment of the disclosure.

FIG. 3A is a diagram illustrating a depth image according to an embodiment of the disclosure, FIG. 3B is a diagram illustrating a natural light image according to an embodiment of the disclosure, FIG. 3C is a diagram illustrating an artificial light image according to an embodiment of the disclosure. A description will be provided with reference to FIGS. 3A, 3B, and 3C.

Referring to FIGS. 3A, 3B, and 3C, a depth image 11, a natural light image 12, and an artificial light image 13 are illustrated, respectively. As described above, the electronic device may capture the depth image 11, the natural light image 12, and the artificial light image 13. For example, the electronic device may include an RGB camera, a depth camera, and a camera flash. The electronic device may capture a depth image 11 by using a depth camera. The natural light image 12 may be captured by using an RGB camera, and the artificial light image 13 may be captured by using an RGB camera and a camera flash. The electronic device may sequentially control the depth camera, the RGB camera, and the camera flash. According to an embodiment of the disclosure, the electronic device may capture the depth image 11 and the natural light image 12 by controlling a depth camera and an RGB camera. The electronic device may capture the artificial light image 13 by using the RGB camera and the camera flash. The electronic device may simultaneously or continuously capture the depth image 11, the natural light image 12, and the artificial light image 13 by a user or automatically. Accordingly, the electronic device may obtain the depth image 11, the natural light image 12, and the artificial light image 13 including the same image at the same position in a short time.

The electronic device may process obtained three pieces of images to obtain the optimization parameter.

Figure 4:
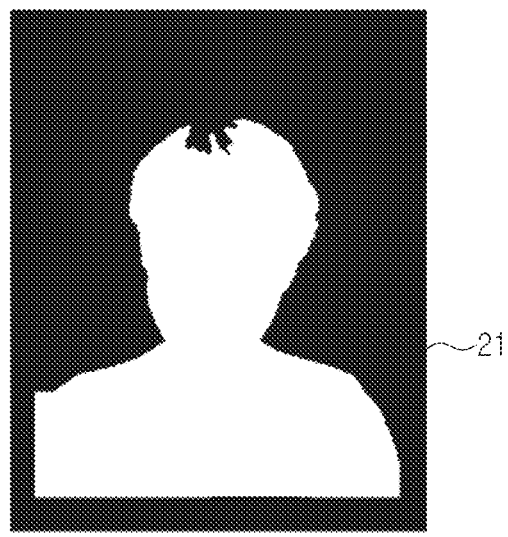
FIG. 4 is a diagram illustrating a depth mask image according to an embodiment of the disclosure.

FIG. 4 is a diagram illustrating a depth mask image according to an embodiment of the disclosure.

Referring to FIG. 4, a depth mask image 21 is illustrated. The electronic device may obtain a depth mask image 21 from the depth image. The depth image includes distance information. Accordingly, the electronic device may obtain distance information of each pixel from the depth image. There is a limit in distance that the depth camera may measure. The depth image may include an object and a background. The object may be located at a relatively close distance, and the background may be located at a relatively far distance. The background may be positioned above a distance that the depth camera may measure. Accordingly, distance information may be included in the pixel forming the object in the depth image, and the distance information may not be included in the pixel forming the background.

The electronic device may set 1 to a pixel including distance information from a depth image, and set 0 to a pixel which does not include distance information. Through the above-described process, the electronic device may obtain a depth mask image as in the example shown in FIG. 4.

The resolution of the RGB camera and the depth camera may be different depending on cases. In one embodiment of the disclosure, the resolution of the RGB camera may be 3042×3042, and the resolution of the depth camera may be 480×640. For example, the resolution of the natural light image, the artificial light image, and the flash image may be 3042×3042, and the depth image may be 480×640. When the resolution of the RGB camera and the depth camera are different, the electronic device may upsample the low-resolution image according to the high-resolution image. Thus, the electronic device may upsample the depth image to 3042×3042.

Figure 5A:
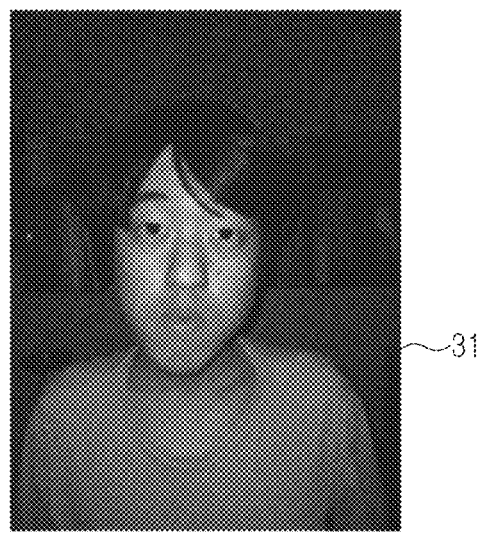
FIG. 5A is a diagram illustrating a flash image according to an embodiment of the disclosure.

FIG. 5A is a diagram illustrating a flash image according to an embodiment of the disclosure.

Referring to FIG. 5A, a flash image 31 is illustrated. The electronic device may obtain the flash image 31 by removing the natural light image from the artificial light image. The natural light image may include a natural light component. The artificial light image may include a natural light component and an artificial light component. The electronic device may obtain the flash image 31 by removing the illuminance of the natural light image from the illuminance of the artificial light image. The flash image 31 may include only an artificial light component. The flash image 31 may be used to obtain an optimization parameter.

The electronic device may generate a cluster mask image other than the depth mask image described in FIG. 4 to perform a process of obtaining an optimization parameter.

Figure 5B:
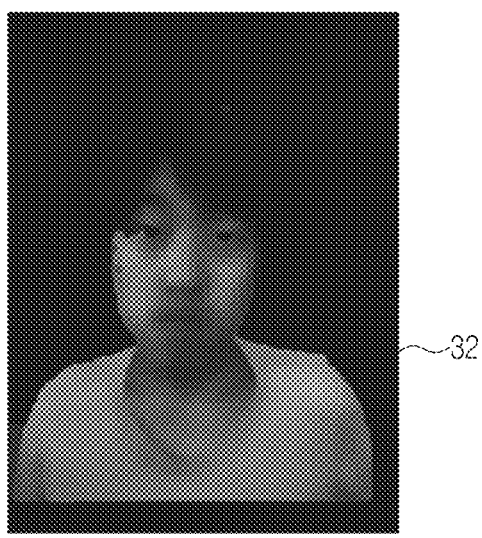
FIG. 5B is a diagram illustrating a super-pixel image according to an embodiment of the disclosure.
Figure 5C:
FIG. 5C is a diagram illustrating a cluster mask image according to an embodiment of the disclosure.

FIG. 5B is a diagram illustrating a super-pixel image according to an embodiment of the disclosure, FIG. 5C is a diagram illustrating a cluster mask image according to an embodiment of the disclosure. A description will be given with reference to FIGS. 5B and 5C.

FIG. 5B illustrates a super-pixel image 32 including an average color value, and FIG. 5C illustrates a cluster mask image 33. For example, a cluster mask image 33 refers to a mask image obtained by dividing skin, hair, clothes, background, or the like, from a natural light image as a mask for use when obtaining reflection information of a face.

The electronic device may filter the natural light image. According to an embodiment of the disclosure, the electronic device may use a bilateral filter based on a natural light image. The bidirectional filter may generate a smooth image by preserving a boundary line and reducing noise by using a mask to which a weight according to a difference in distance and brightness is applied from a central pixel. The electronic device may preserve the edge using the bidirectional filter and reduce the detail of the high frequency band of the image. A super pixel may be identified based on the filtered image. According to an embodiment of the disclosure, the electronic device may identify a super pixel by using a simple linear iterative clustering (SLIC) algorithm. According to an embodiment of the disclosure, an image obtained by assigning an average color value to a super pixel obtained by using a SLIC is illustrated in FIG. 5B.

The electronic device may identify super-pixels and perform a clustering process based on the identified super-pixels. According to an embodiment of the disclosure, the electronic device may set each super pixel as an independent cluster. The electronic device may generate a weight graph between clusters. A node (vertex) of the weight graph may mean each cluster. The edges (a trunk line) of the weight graph may be the average color distances of the adjacent portions of the two clusters. A color distance between the two clusters may be calculated as an L2 norm of an average color difference by applying a weight to an adjacent length based on an average color difference of super pixels adjacent to a boundary of the two clusters and included in each of the two clusters.

The electronic device may calculate an average color value of cluster. As an embodiment of the disclosure, the average color value of cluster may be calculated based on the pixel number and average color value of super pixels included in the cluster.

The electronic device may sort the edges in ascending order of edge weights. The electronic device may sequentially search for an edge and determine whether to combine two clusters connected to a corresponding edge. The above-described search process may be referred to as a loop. The electronic device may not merge the two clusters when both clusters have been already combined with other clusters in the current loop. When only one node is combined, the electronic device may combine another node with the corresponding cluster. Meanwhile, when the distance between the average color values of the two clusters exceeds a specific threshold value, the electronic device may not merge the two clusters. The electronic device may combine the two clusters only when the edge weight is less than or equal to the weight threshold value, and may not merge if the edge weight exceeds the weight threshold value.

The electronic device may repeat the above-described loop process until the two clusters are not combined. The electronic device may repeat the loop process while constantly increasing the weight threshold value of the edge. The electronic device may terminate the algorithm when the weight threshold value reaches a preset maximum weight threshold value.

The clustering algorithm of the disclosure is a graph-based clustering technology in an image space unlike an existing multidimensional-based clustering technology. The clustering algorithm of the disclosure may ensure connectivity of a cluster, and may identify and cluster regional trends by simultaneously generating and combining clusters.

In one embodiment of the disclosure, a result image obtained by performing a region clustering process is shown in FIG. 5C. For example, the electronic device may generate a cluster mask image through the above-described process.

Figure 6A:
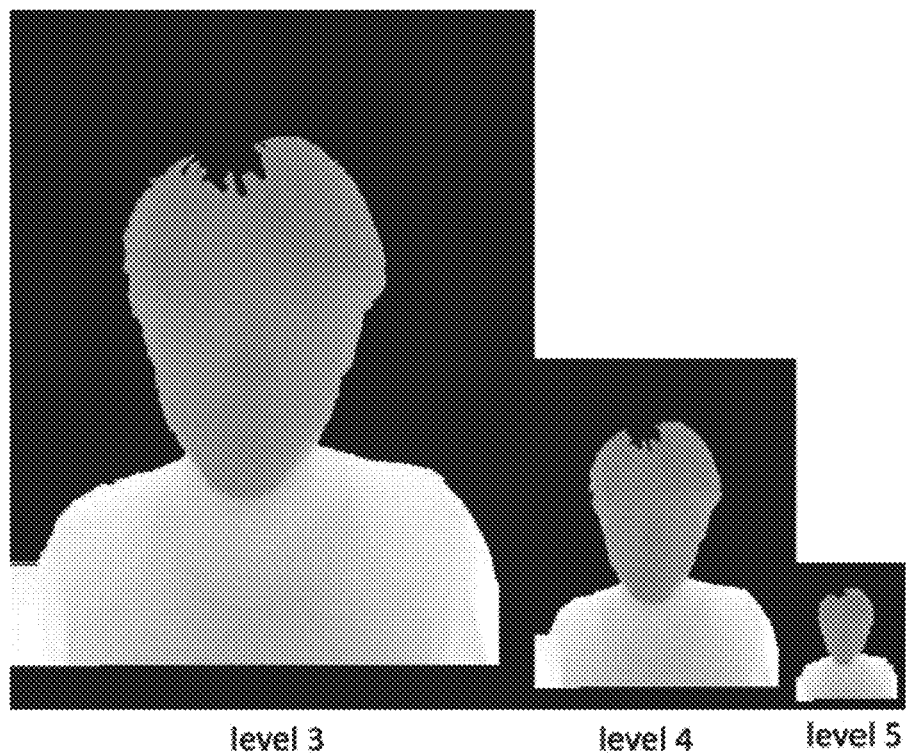
FIG. 6A is a diagram illustrating a pyramid of a depth mask image according to an embodiment of the disclosure.
Figure 6B:
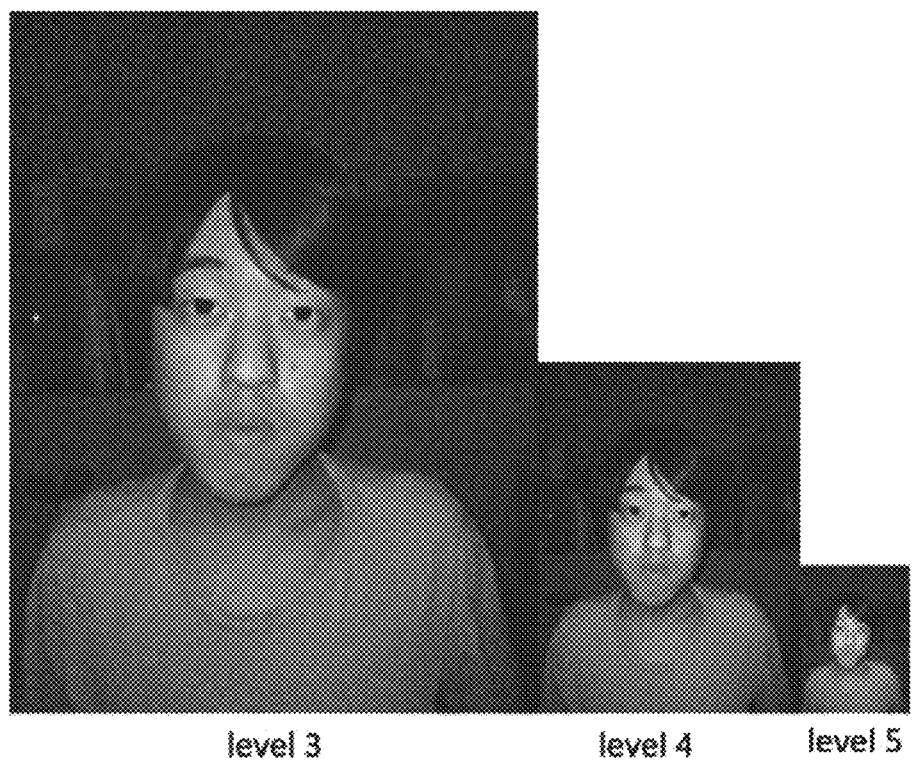
FIG. 6B is a diagram illustrating a pyramid of a flash image according to an embodiment of the disclosure.

FIG. 6A is a diagram illustrating a pyramid of a depth mask image according to an embodiment of the disclosure, FIG. 6B is a diagram illustrating a pyramid of a flash image according to an embodiment of the disclosure. A description will be given with reference to FIGS. 6A and 6B.

The electronic device obtains an optimization parameter based on distance information $\{D_{org,\ l}\}_{l=5}^{l=3}$, a depth mask image, a cluster mask image, and a flash image. $\{I_l\}_{l=5}^{l=3}$. For example, the electronic device may obtain an optimization parameter by generating an image pyramid for various resolutions, performing an optimization process from a coarse level, and updating a parameter by using a parameter calculated by performing an optimization process from a coarse level to a finer next level. The electronic device may down-sample distance information, a flash image, a depth mask image, and a cluster mask image, which are input data, to generate an image pyramid. According to an embodiment of the disclosure, the resolution of an initial image may be 3042×3042, and may be set as an image of level 0. The image pyramid may be generated up to an image of level 5 by reducing the resolution into half of width and height, respectively. If the resolution of the original depth image is 480×640, a depth image may be projected using a calibration parameter to a resolution (e.g., 378×504) of a down-sampled RGB image (flash image) of level 3. The down-sampled RGB image of level 3 may be set to the highest level used in the optimization process. In addition, an optimization process may be performed from the image of the two-step further down-sampled level 5. For example, the resolution of the image of level 4 may be 189×252, and the resolution of the image of level 5 may be 94×126.

An image of level 3 may be set to the highest level used in the optimization process. An optimization process may be performed from the two-step further down-sampled image of level 5. At this time, the resolution of level 4 may be 189×252, and the resolution of level 5 may be 94×126.

FIG. 6A illustrates image pyramids of level 3, 4, 5 of flash images, and FIG. 6B illustrates image pyramids of level 3, 4, 5 of depth image.

According to an embodiment of the disclosure, the rendering function may be implemented based on a cook-tolerance and a GGX model. The term $D(r,\theta_h)$ representing a microfacet distribution and the term $\overline{G}(n,\ r,\ l,\ v)$ representing a geometric attenuation may be implemented based on a GGX. Since the Fresnel term is not well-observed in the flash image, it may be regarded as a constant term. In this case, it is assumed that the characteristic of an object is a non-conductor, and the specular albedo is set as a scalar value, thereby reducing parameter complexity. The rendering image (I) and the rendering function (F) may be expressed as a multiplication of a shading function ($<n,\ 1>$). The equation for rendering may be expressed as Equation 1 to Equation 4.

$$I = f(n,l,v)\langle n,l\rangle \qquad \text{Equation 1}$$

Here, n represents to a normal vector, l represents to a light vector, and v represents a view vector.

$$f(n,\ 1,\ v) = \qquad \text{Equation 2}$$
$$\frac{\rho}{\pi} + sD(r,\ \theta_h)\frac{G(n,\ r,\ 1,\ v)}{\pi(n\cdot 1)(n\cdot v)} = \frac{\rho}{\pi} + sD(r,\ \theta_h)\tilde{G}(n,\ r,\ 1,\ v)$$

$$\tilde{G}(n,\ r,\ 1,\ v) = \frac{G(n,\ r,\ 1,\ v)}{\pi(n\cdot 1)(n\cdot v)} \qquad \text{Equation 3}$$

$$\langle n,\ 1\rangle = n\cdot 1 \qquad \text{Equation 4}$$

Optimization parameters may include depth variation (dD) included in geometry for each level, twist representation (R) of normal vector, and diffuse albedo (p) included in SVBRDF, specular albedo (s) and roughness (r) for each cluster. Since diffuse albedo is a unique color that an object has regardless of lighting and camera viewpoint, a value may be calculated for each pixel, and specular albedo and roughness are values for the characteristics of an object, so one value per cluster may be calculated. For example, a cluster mask means each independent area for background, hair, skin, top, or the like.

The disclosure may perform an optimization process at various resolutions as a change in a depth and a normal vector, and a diffuse albedo are calculated in an order from a coarse level to a fine level. As described above, when the resolution of the original image is set to level 0 in the image pyramid, the image of which the ratio to the horizontal and vertical is 2-1 times is level 1. The depth and the normal vector may be expressed as $D_l+dD_l$, $R_l(n_l)$, respectively, by using the depth change and the direction vector change angle of the normal vector. Finally, all optimization parameters x may be expressed as Equation 5. The l is an image pyramid level.

$$\chi = \{\{dD_l, R_l, p_l\}\}_{l=5}^{l=3}, \{(s,r)\}_{c=0\ldots3}\} \qquad \text{Equation 5}$$

The optimization algorithm is a process of finding a parameter to minimize one objective function like Equation 6.

$$\chi^* = \underset{\chi}{\operatorname{argmin}} \psi_D + \psi_n + \psi_{n,reg} + \psi_P + \psi_{p,reg} \qquad \text{Equation 6}$$

Here, $\psi_D$ is a depth data loss function, $\psi_n$ is a normal data loss function, $\psi_{n,reg}$ is a normal line normalization loss function, $\psi_P$ is a photometric data loss function, and $\psi_{\rho,reg}$ is a diffuse albedo normalization loss function.

There is a restriction condition in the depth which is geometry and normal vector change angle and this may be expressed as Equation 7 to Equation 10.

$$\tilde{D}_l = (D_l + dD_l) \qquad \text{Equation 7}$$

$$\psi_D(\chi) = \frac{1}{N_l} \sum \|\tilde{D}_l - D_{org,l}\|_2^2 \qquad \text{Equation 8}$$

$$\psi_n(\chi) = \frac{1}{N_l} \sum \|R_l(n_l) - F(\tilde{D}_l)\|_2^2 \qquad \text{Equation 9}$$

$$\psi_{n,rep}(\chi) = \frac{1}{N_l} \sum \|R_l(n_l)(u+1, v) - R_l(n_l)(u, v)\|_2^2 + \qquad \text{Equation 10}$$

$$\frac{1}{N_l} \sum \|R_l(n_l)(u, v+1) - R_l(n_l)(u, v)\|_2^2$$

Here, (u, v) is a pixel position, $\overline{D}_l$ is a depth to which a degree of change of depth $dD_l$ is reflected, $\{D_{org,l}\}_{l=5}^{l=3}$ is a depth pyramid, $N_l$ is the number of front pixels filtered by a depth mask for each level, and F is a function of changing distance information into a normal vector.

$\psi_D$, $\psi_n$ are data terms that provide a constraint that depth and parameters that optimize with respect to a normal vector obtained using depth should be similar $\Psi_{n,reg}$ are regularizer that a normal vector to be optimized should be smoothly changed with respect to the surroundings. Initially obtained depth is coarse and noisy so an initial normal vector is measured to be uneven, but this regularizer makes the normal vector smooth as the optimization process proceeds. The regularizer is derived from the assumption that the macro topography of a human's face is changed to be smooth.

The disclosure may simultaneously perform optimization of depth and normal vector. If the optimization is performed by using only the depth, there is a tendency to fall in the local optimizer, and a better prediction value may be obtained by performing optimization by using the term related to the normal vector with the depth.

The optimization parameters related to surface reflection information may include a diffuse albedo ρ, a specular albedo s and a roughness r per cluster. An objective function using an optimization parameter related to surface reflection information is as shown in Equation 11 and Equation 12.

$$\psi_{p,reg}(\chi) = \frac{1}{N_l} \sum \|\rho_l(u+1, v) - \rho_l(u, v)\|_2^2 + \qquad \text{Equation 11}$$

$$\frac{1}{N_l} \sum \|\rho_l(u, v+1) - \rho_l(u, v)\|_2^2$$

$$\psi_P(\chi) = \frac{1}{N_l} \sum \|V \diamond (I_l - \tilde{I}(D_l, n_l, f))\|_l \qquad \text{Equation 12}$$

V=1 if n·l>0, n·v>0
V=0 otherwise $\psi_{\rho,reg}$ is a regularizer that gives a constraint so that the diffuse albedo varies spatially smoothly. The '◊' symbol represents a Hadamard product. The $\psi_P$ is a photometric consistency term of a photometer which forces a rendered image $\tilde{I}$ to be similar using a flash image pyramid II and an optimization parameter. The V is a visibility term that is shared to RGB three channels in which 1 or otherwise 0 is assigned if one point in 3D is seen in both the illuminance and the camera.

In an embodiment of the disclosure, the rendering image $\tilde{I}$ may be implemented based on a Cook-Torrance and a GGX model, and may be expressed as Equation 13 to Equation 16.

$$\tilde{I}(D_l, n_l, f) = f(n_l, 1_l, v_l)\langle R_l(n_l), 1_l\rangle \qquad \text{Equation 13}$$

$$f(n_l, 1, v) = \qquad \text{Equation 14}$$

$$\frac{\rho_l}{\pi} + sD(r, \theta_h)\frac{G(n_l, r, 1, v)}{\pi(n_l \cdot 1)(n_l \cdot v)} = \frac{\rho_l}{\pi} + sD(r, \theta_h)\tilde{G}(n_l, r, 1, v)$$

$$\tilde{G}(n_l, r, 1, v) = \frac{G(n_l, r, 1, v)}{\pi(n_l \cdot I)(n_l \cdot v)} \qquad \text{Equation 15}$$

$$\langle R_l(n_l), 1_l\rangle = R_l(n_l) \cdot I_l \qquad \text{Equation 16}$$

The process of obtaining optimization parameters may proceed to repeat the objective function several times in the lowest step (l=5). Among the optimization parameters obtained at each level, a depth D, a normal vector, and a diffuse albedo ρ may be up-sampled through nearest neighbor interpolation (opencv INTER_AREA) so as to be used as an initial value of the next level.

$$\{D, R(n), \rho\}_{l+1} = \text{upsample}(\{D+dD, R(n), p\}_l) \qquad \text{Equation 17}$$

When the initialization process begins initially, the depth of (l=5) may be expressed as a value obtained by a depth camera Equation 18.

$$\tilde{D}_{l=5}^{init} = D_{org, l=5} \qquad \text{Equation 18}$$

When an optimization process starts at each level, a change in depth may be initialized to 0. Through the above-described process, the variation of the depth for the fine level from the coarse level may be kept applied to the depth.

An initial normal vector may be obtained from the gradient by sending the initially obtained depth to the point cloud using camera parameters obtained through calibration. The camera parameters are image center pixel coordinates (cx, $c_y$) and camera focal lengths ($f_x$, $f_y$) in pixel units. As to 3D point P(u, v), point cloud corresponding to each pixel (u, v) may be obtained based on a camera parameter, and may be obtained using Equation 19 and Equation 20 by using the obtained point cloud.

$$P(u, v) = \left[ \frac{u - c_x}{f_x} \quad \frac{v - c_y}{f_y} \quad 1 \right] \tilde{D}_{l=5}^{init}(u, v) \quad \text{Equation 19}$$

$$n_{l=5}^{init} = \frac{dP}{dx} \times \frac{dP}{dy} \quad \text{Equation 20}$$

The change angle of the normal vector is initialized to 0 for each step in the optimization of each level, and when loss for the objective function is updated, the updated loss may be obtained by applying the updated loss to the normal vector.

The diffuse image value obtained when light is reflected by the defused object and comes into the camera may be represented by the diffuse albedo product of objects and shading by illuminance. However, since the defuse image cannot be separated in a state in which the initial specular albedo is not accurate, the initial diffuse albedo may be initialized and used as a value obtained by dividing the color image directly from the color image as in Equation 21.

$$\rho_{l=5}^{init} = \frac{I_{l=5}}{\langle R_{l=5}(n_{l=5}^{init}), I_{l=5} \rangle} \quad \text{Equation 21}$$

The initial specular albedo and the roughness value may be allocated as a uniform distribution for each cluster. In one embodiment of the disclosure, the specular albedo and roughness may be initialized to 0.3, 0.3, respectively. In addition, as an embodiment of the disclosure, the optimization may be performed by an Adam optimizer, and the weight of each objective function may be set as follows.

$(\lambda_D, \lambda_n, \lambda_{n,reg}, \lambda_P, \lambda_{\rho,reg}) = (1, 10^2, 10^2, 10^3, 10^4)$ $\lambda_D, \lambda_n, \lambda_{n,reg}, \lambda_P, \lambda_{\rho,reg}$ are weights corresponding to $\psi_D$, $\psi_n$, $\psi_{n,reg}$, $\psi_P$, $\psi_{\rho,reg}$ loss terms in each optimization function.

Figure 7:
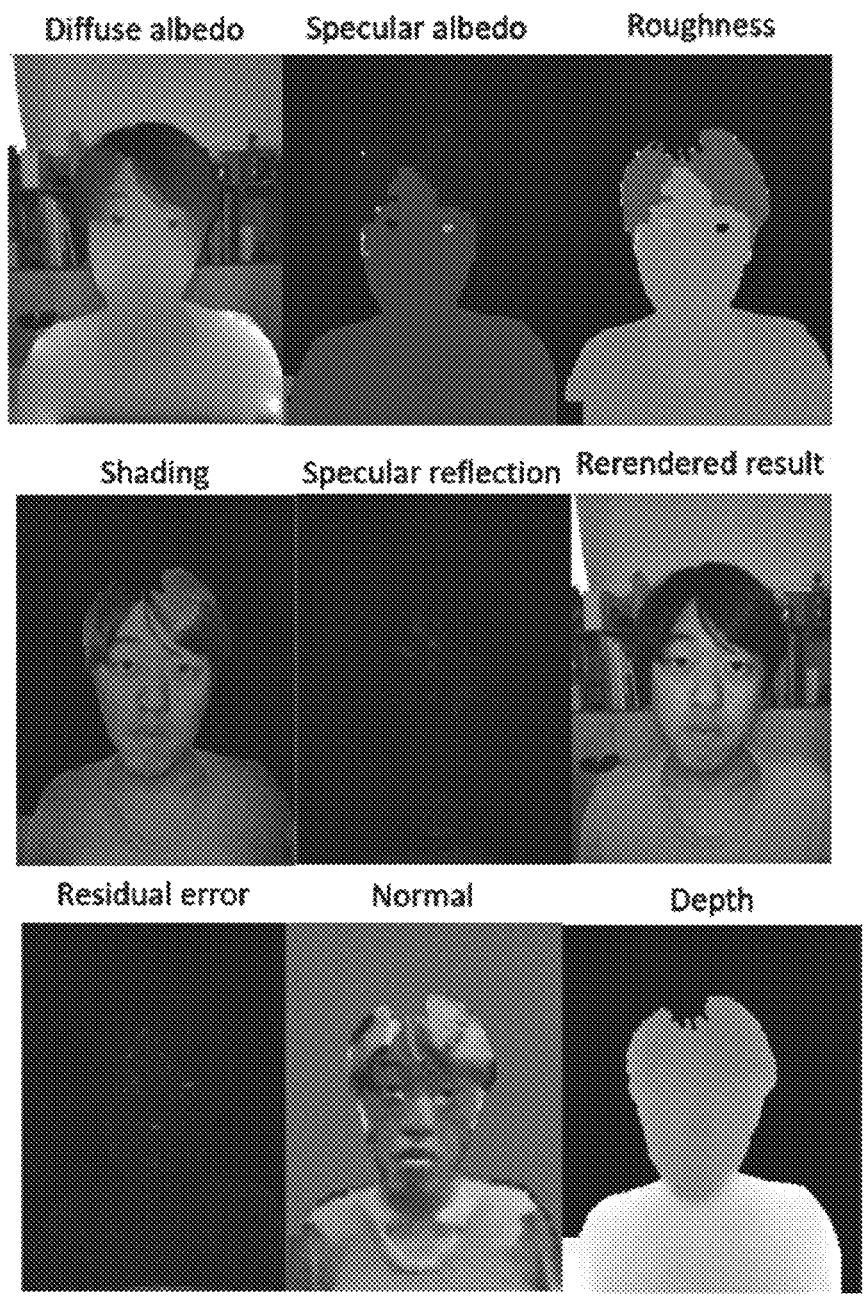
FIG. 7 is a diagram illustrating a result image according to an embodiment of the disclosure.

FIG. 7 is a diagram illustrating a result image according to an embodiment of the disclosure.

Referring to FIG. 7, the optimization parameters and results obtained when the optimization process is terminated are shown. For example, the optimization parameter may include a diffuse albedo, specular albedo, roughness per cluster, shading, specular reflection, re-rendered result, residual error, normal, depth, depth change, change angle of normal vector, and the like.

The 3D geometry may be obtained based on a depth change among optimization parameters and a change angle of a normal vector, and surface reflection information may be obtained based on the diffuse albedo and the specular albedo and roughness information per each cluster.

An embodiment of obtaining 3D geometry and surface reflection information has been described. A control process of the electronic device is described below.

Figure 8:
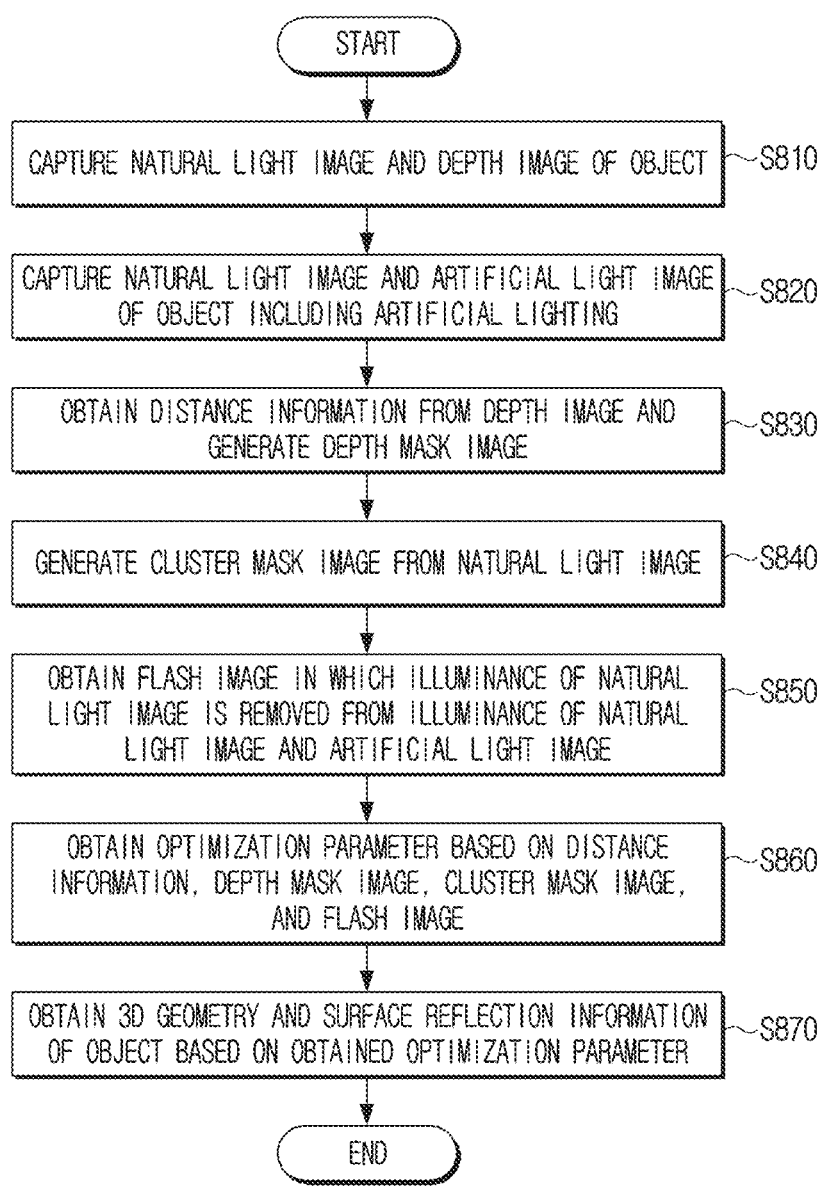
FIG. 8 is a flowchart illustrating a control method of an electronic device according to an embodiment of the disclosure.

FIG. 8 is a flowchart illustrating a control method of an electronic device according to an embodiment of the disclosure.

Referring to FIG. 8, the electronic device captures a natural light image and a depth image of an object in operation S810, and captures an artificial light image of an object including artificial lighting in operation S820. The natural light image includes only a natural light component, and the artificial light image may include a natural light component and an artificial light component.

The electronic device obtains distance information from the depth image and generates a depth mask image in operation S830. The electronic device may generate a depth mask image based on the obtained distance information. For example, the electronic device may generate the depth mask image by setting a pixel including distance information from among the depth images to 1, and setting a pixel having no distance information to 0.

The electronic device generates a cluster mask image from the natural light image in operation S840. For example, the electronic device may filter the natural light image to identify the super pixel. The electronic device may set a super pixel as an independent cluster and generate a weight graph between the clusters. The weight graph may include a node representing each cluster and an edge indicating an average color distance of regions adjacent to the plurality of clusters.

The electronic device may obtain an edge weight to which a weight is applied to a difference between average color values between super pixels included in each adjacent cluster based on adjacent lengths between the clusters. In addition, the electronic device may obtain an average color value of the cluster. The electronic device may combine the cluster when the obtained distance of the average color value is equal to or less than a preset color threshold value and the edge weight is less than or equal to a preset weight threshold value. The electronic device may repeat the above-described process to generate a cluster mask image.

The electronic device obtains a flash image in which the illuminance of the natural light image is removed from the illumination of the artificial light image in operation S850. The electronic device obtains an optimization parameter based on the distance information, the depth mask image, the cluster mask image, and the flash image in operation S860. For example, the electronic device may generate an image pyramid including a plurality of images by downsampling the depth mask image, cluster mask image, and flash image to a preset size. The electronic device may obtain a first optimization parameter from the smallest image among the generated image pyramid, and may obtain a second optimization parameter from the image of the next size based on the obtained first optimization parameter. The electronic device may sequentially obtain an optimization parameter for an image of a next level. An optimization parameter obtained from the largest image may be a final optimization parameter. According to an embodiment of the disclosure, the optimization parameter may include a depth change, a change angle of a normal vector, a diffuse albedo, a specular albedo, roughness information per cluster, and the like.

The electronic device obtains 3D geometry and surface reflection information of the object based on the obtained optimization parameter in operation S870. For example, the 3D geometry may be obtained from a depth change, a change angle of a normal vector, and the surface reflection information may be obtained from a diffuse albedo, a specular albedo and roughness information per each cluster.

The electronic device may generate and display an image including a 3D object based on the obtained geometry and surface reflection information of the object.

The electronic device may obtain, based on two color images and one depth image, specular albedo and roughness information of the surface. Therefore, the electronic device may restore realistic 3D information by using small data within a short time and a small number of control times in an electronic device.

A method for controlling an electronic device according to various embodiments of the disclosure described above may be provided as a computer program product. The computer program product may include a software (S/W)

program or a non-transitory computer readable medium in which an S/W program is stored.

The non-transitory computer-readable medium is not a medium storing data for a short period of time, such as a register, a cache, or a memory, but may refer to a medium that semi-permanently stores data and is readable by a machine. Specific examples of the non-transitory computer-readable medium may include a compact disc (CD), a digital versatile disc (DVD), a hard disk drive, a Blu-ray disc, a universal serial bus (USB), a memory card, and a ROM.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a camera flash; and
   at least one processor configured to:
      control the camera to capture a natural light image and a depth image of an object,
      control the camera and the camera flash to capture an artificial light image of the object comprising an artificial lighting,
      obtain distance information from the depth image and generate a depth mask image,
      generate a cluster mask image from the natural light image,
      obtain a flash image in which illuminance of the natural light image has been removed from the illuminance of the artificial light image,
      obtain an optimization parameter based on the distance information, the depth mask image, the cluster mask image, and the flash image, and
      obtain three-dimensional (3D) geometry and surface reflection information about the object based on the obtained optimization parameter.

2. The electronic device of claim 1, further comprising:
   a display to display an image comprising a 3D object based on the obtained 3D geometry and surface reflection information of the object.

3. The electronic device of claim 1, wherein the at least one processor is further configured to generate an image pyramid comprising a plurality of images by downsampling the depth mask image, cluster mask image, and flash image to a preset size.

4. The electronic device of claim 3, wherein the at least one processor is further configured to:
   obtain a first optimization parameter from the smallest image among the generated image pyramid,
   obtain a second optimization parameter from the image of the next size based on the obtained first optimization parameter, and
   obtain the optimization parameter from the largest image based on obtained n−1 optimization parameter.

5. The electronic device of claim 1, wherein the at least one processor is further configured to:
   set a pixel comprising distance information from among the depth images to 1, and
   set a pixel having no distance information to 0 based on the distance information so as to generate the depth mask image.

6. The electronic device of claim 1, wherein the at least one processor is further configured to:
   identify a super-pixel by filtering the natural light image, and
   generate the cluster mask image based on the identified super-pixel.

7. The electronic device of claim 6, wherein the at least one processor is further configured to:
   set the super-pixel to an independent cluster,
   generate a weight graph between clusters including a node representing each cluster and an edge representing an average color distance of an area in which a plurality of clusters are adjacent,
   obtain an edge weight by applying a weight to a difference in average color values between super-pixels included in and each adjacent cluster based on adjacent length between the clusters,
   obtain an average color value of the cluster, and
   based on the obtained average color value being less than or equal to a preset color threshold and the edge weight being less than or equal to the preset weight threshold value, generate the cluster mask image by merging clusters.

8. The electronic device of claim 1, wherein the optimization parameter comprises depth change, change angle of a normal vector, diffuse albedo, specular albedo and roughness information per cluster.

9. The electronic device of claim 8, wherein the at least one processor is further configured to obtain the 3D geometry based on the depth change and the change angle of the normal vector.

10. The electronic device of claim 8, wherein the at least one processor is further configured to obtain the surface reflection information based on the diffuse albedo, specular albedo and roughness information per cluster.

11. A method of controlling an electronic device, the method comprising:
   capturing a natural light image and a depth image of an object;
   capturing an artificial light image of the object comprising an artificial lighting;
   obtaining distance information from the depth image and generating a depth mask image;
   generating a cluster mask image from the natural light image;
   obtaining a flash image in which illuminance of the natural light image has been removed from the illuminance of the artificial light image;
   obtaining an optimization parameter based on the distance information, the depth mask image, the cluster mask image, and the flash image; and
   obtaining three-dimensional (3D) geometry and surface reflection information about the object based on the obtained optimization parameter.

12. The method of claim 11, further comprising:
   displaying an image comprising a 3D object based on the obtained 3D geometry and surface reflection information of the object.

13. The method of claim 11, wherein the obtaining of the optimization parameter comprises generating an image pyramid comprising a plurality of images by downsampling the depth mask image, cluster mask image, and flash image to a preset size.

14. The method of claim 13, wherein the obtaining of the optimization parameter comprises:
   obtaining a first optimization parameter from the smallest image among the generated image pyramid;

obtaining a second optimization parameter from the image of the next size based on the obtained first optimization parameter; and obtaining the optimization parameter from the largest image based on obtained n−1 optimization parameter.

15. The method of claim 11, wherein the generating of the depth mask image comprises:

setting a pixel comprising distance information from among the depth images to 1; and setting a pixel having no distance information to 0 based on the distance information so as to generate the depth mask image.

* * * * *